United States Patent Office 2,948,744
Patented Aug. 9, 1960

2,948,744

PROCESS FOR THE PREPARATION OF CYCLO-PENTADIENYL MANGANESE TRICARBONYL

Vincent F. Hnizda, Huntington Woods, Mich., assignor to Ethyl Corporation, New York, N.Y., a corporation of Delaware No Drawing. Filed June 12, 1957, Ser. No. 665,126

2 Claims. (Cl. 260—429)

This invention relates to metallic cyclomatic compounds and more particularly to a novel process for their preparation.

Metallic cyclomatic compounds possess properties which render them useful as fuel additives and as chemical intermediates. In particular cyclopentadienyl manganese tricarbonyl compounds are valuable as antiknock agents when added to gasoline. It has been proposed to prepare these compounds by a process which broadly consists of forming an intermediate dicyclopentadienyl manganese compound by the reaction between a manganese salt and an alkali metal cyclopentadienyl compound in a special solvent, following which this intermediate is reacted under high pressure at elevated temperatures with carbon monoxide to form the desired cyclopentadienyl manganese tricarbonyl compound. This process has numerous disadvantages.

One outstanding difficulty with the above outlined method for the preparation of cyclopentadienyl manganese tricarbonyl compounds is that the dicyclopentadienyl manganese compound is unstable and requires special handling during the process to prevent its destruction by atmospheric oxidation. A further disadvantage of the above process is that when the dicyclopentadienyl manganese intermediate is reacted with carbon monoxide, one-half of the cyclopentadienyl hydrocarbon originally employed to prepare the intermediate is dissipated in a form which renders its recovery extremely difficult.

Therefore, it is an object of this invention to provide a novel process for the preparation of metallic cyclomatic compounds of manganese. It is, likewise, an object of the present invention to provide a process for the manufacture of cyclomatic manganese compounds which process is applicable to commercial operation. Other important objects of the present invention will become apparent from the discussion hereinafter.

It has been found that the above and other objects can be accomplished by a process for the preparation of a cyclopentadienyl manganese tricarbonyl compound which comprises reacting a manganese pentacarbonyl with a cyclomatic hydrocarbon at relatively low temperatures.

This reaction may be illustrated in the case of cyclopentadiene and manganese pentacarbonyl by the formula $$[Mn(CO)_5]_2 + 2C_5H_6 \rightarrow C_5H_5MN(CO)_3 + 4CO + H_2$$

The process of this invention eliminates the use of the unstable dicyclopentadienyl manganese intermediate and the high loss of cyclopentadienyl hydrocarbon which accompanies its use. Thus, substantial savings in process equipment, time and starting materials are affected by the process of this invention.

When manganese pentacarbonyl is reacted with an excess of di(methylcyclopentadiene) according to this invention, an excellent yield of methylcyclopentadienyl manganese tricarbonyl is recovered and any unreacted di(methylcyclopentadiene) and manganese carbonyl are available for re-cycle and further reaction. In general the manganese pentacarbonyls employed in the processes of the instant invention comprise compounds having the general formula $$Mn(CO)_5(X)_a$$

wherein X is a halogen coordinating group and $a$ is 1 or 0. Thus, the metallic carbonyls utilized in the processes of this invention comprise manganese carbonyl and the manganese carbonyl halides.

Manganese pentacarbonyl, which is a reactant in a preferred process of this invention, exists as the dimer having the formula $$[Mn(CO)_5]_2$$

and is prepared, for example, by a process which comprises the reduction of a manganese halide with a reducing agent such as magnesium in the presence of a catalyst under pressure of carbon monoxide at elevated temperature. This compound is solid at ordinary temperatures, having a melting point when pure of about 155° C., and the density of about 1.2. It is stable in the ordinary sense of the term up to a temperature of about 200° C.

The manganese carbonyls employed in the processes of the present invention can contain a coordinating group designated as X. This group is comprised of the halogens having atomic number of at least 17, to-wit: chlorine, bromine and iodine. Manganese pentacarbonyl chloride, manganese pentacarbonyl bromide and manganese pentacarbonyl iodide are applicable to the process of this invention. These compounds are prepared from manganese carbonyl by reacting manganese carbonyl with the halogen in an inert liquid solvent such as carbon disulfide, iso-butane, chloro propane and the like.

By the term cyclomatic hydrocarbons is intended hydrocarbons of the cyclopentadiene-type, that is, compounds which contain the cyclopentadienyl moiety. The cyclomatic hydrocarbons can be monomeric or polymeric materials. In general, therefore, the cyclomatic hydrocarbons which can be employed in the processes of the present invention include such substances as cyclopentadiene, dicyclopentadiene, indene, fluorene and derivatives thereof. For the purpose of greater clarification the cyclopentadienyl moiety which is present in the cyclomatic hydrocarbons utilized in the processes of this invention can be represented by the following general formula

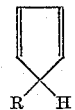

wherein R is selected from the group consisting of hydrogen and hydrocarbon radicals. The term "hydrocarbon radicals" is intended to encompass univalent aliphatic, alicyclic and aromatic radicals as defined hereinafter.

A univalent aliphatic radical is a univalent organic radical derived from an opening chain saturated or unsaturated carbon compound, that is, an acyclic radical. The term univalent alicyclic radical denotes a monovalent organic radical derived from the corresponding aliphatic compounds by ring formation. Likewise, the term univalent aromatic radical denotes a monovalent radical derived from a compound of the benzene series containing at least one ring with the peculiar type of unsaturation inherent in such aromatic compounds.

Thus, when the hydrocarbon radical or radicals of the cyclomatic hydrocarbons utilized in the processes of the present invention are univalent aliphatic, they can be a radical or radicals selected from the group consisting of alkyl and aralkyl. Consequently, when the radical or radicals are alkyl radicals, they include such groups as methyl, ethyl, n-propyl, isopropyl, n-butyl, isobutyl, sec-butyl, t-butyl, n-amyl and the various positional isomers thereof and likewise, the corresponding straight and branched chain isomers of hexyl, heptyl, octyl and analogous radicals up to and including about eicosyl.

When the organic radicals of the cyclomatic hydrocarbons used in the processes of the present invention are univalent aromatic, they can be selected from the group consisting of aryl and alkaryl radicals. Illustrative examples include phenyl, α-naphthyl, β-anthryl and the like.

A class of cyclomatic hydrocarbons which are employed in the processes of the present invention are cyclopentadienyl hydrocarbons which can be represented by the following general formula

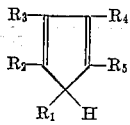

wherein each of $R_1$, $R_2$, $R_3$, $R_4$ and $R_5$ can be the same or different and is selected from the group consisting of hydrogen and hydrocarbon radicals. Thus, as a starting material I can use a cyclomatic hydrocarbon such as cyclopentadiene, methyl-cyclopentadiene, dimethyl-cyclopentadiene, butyl-cyclopentadiene, phenyl-cyclopentadiene, (o-tolyl)-cyclopentadiene, dicyclopentadiene, dimethyldicyclopentadiene and the like.

As indicated above the cyclomatic hydrocarbons employed in this process contain the cyclopentadienyl moiety and thus encompass such cyclomatic hydrocarbons as indene, fluorene and derivatives thereof. As in the case of the simpler cyclopentadiene type radicals the nucleus of the hydrocarbons, that is, the indene and fluorene nuclei can be substituted with organic radicals of the class described hereinbefore. Consequently, such cyclomatic hydrocarbons as indene, 1-methyl-indene, 2,3-dipropyl-indene, 4,5,6,7-tetrahydro-indene, fluorene, 1-methyl-fluorene, 3,6-diethyl-fluorene and the like can be employed.

It has been found that by mixing a manganese carbonyl and a cyclomatic hydrocarbon and heating the mixture to a temperature sufficient to bring about the desired reaction, a cyclomatic manganese tricarbonyl compound is produced. The temperature at which this reaction is conducted is governed by several considerations. First, the temperature is determined by the nature of the starting materials, that is, the nature of the metallic carbonyl and of the cyclomatic hydrocarbon employed. Second, the temperature selected is contingent upon the kinetics of the reaction or, in other words, a temperature is selected at which the optimum rate of reaction occurs.

It is especially desirable to conduct the reaction to prepare a cyclopentadienyl manganese tricarbonyl compound using manganese carbonyl and a cyclopentadienyl hydrocarbon compound which is a liquid and which thus serves as a carrier for the manganese pentacarbonyl reactant. When such a liquid cyclopentadienyl compound is employed, the reaction is preferably conducted in the liquid phase. The reaction ordinarily takes place at mildly elevated temperatures up to about 300° C. Preferred temperatures are in the range of 100 to 300° C. as it has been found that within this range the reaction gives a high yield of cyclopentadienyl manganese tricarbonyl compound with a minimum of undesirable side reactions.

The reaction time for preparing a cyclopentadienyl manganese tricarbonyl compound according to the process of this invention varies somewhat depending upon the cyclopentadienyl hydrocarbon employed and the temperature used. However, a reaction time of from about 2 hours to about 20 hours is successfully employed.

The product cyclopentadienyl manganese tricarbonyl is separated from the reaction mixture by various techniques depending upon whether the product is a liquid or a solid. If it is a solid, it may be separated by distillation followed by sublimation. Any unreacted manganese carbonyl which is carried into the final product is conveniently separated by fractional sublimation.

If desired, the reaction may be conducted in the presence of a diluent which is inert under the conditions of the reaction. Liquid aromatic and aliphatic hydrocarbons and ethers are conveniently employed as such diluents.

A preferred embodiment of the present invention comprises the reaction between manganese carbonyl and di-(methylcyclopentadiene) to form methylcyclopentadienyl manganese tricarbonyl. This embodiment of the invention is preferred as the product methylcyclopentadienyl manganese tricarbonyl has been found to be an antiknock agent outstanding activity.

A preferred method of conducting the process of this invention involves a vapor phase reaction which is particularly suited for continuous operation although such a process is susceptible of use as a batch process. In general, this method consists of causing interaction between a manganese pentacarbonyl and a cyclomatic hydrocarbon both of which are in the vapor or gaseous state of aggregation. It has also been found efficacious to provide a large foraminous or other porous surface upon which the reaction is to occur. By so doing, an additional benefit is to be obtained, namely, the insurance of complete mixing of the gases or vapors of the reactants.

The following examples are illustrative of the present invention.

Example I

The apparatus used in this experiment consists essentially of a pair of distillation vessels both of which are equipped with heating means, the first vessel adapted to contain a cyclomatic hydrocarbon, and the second the manganese pentacarbonyl, and a thermal reactor tube containing a glass wool packing to act as a mixing and reaction surface. These components of the apparatus are placed in direct physical communication by means of connection lines such that vaporized reactants are partly mixed prior to entering the thermal reactor tube. To facilitate the transfer of the vaporized reactants an inert carrier comprising dry nitrogen gas is continuously passed through the vessels to the junction between the two aforesaid vessels and on through the thermal reactor. To the first distillation vessel is added 50 parts of crude dicyclopentadiene. To the second distillation vessel is added approximately 10 parts of manganese pentacarbonyl. After supplying a continuous flow of essentially anhydrous nitrogen gas throughout the entire apparatus, the dicyclopentadiene-containing vessel is heated to a temperature in the order of about 180° C. such that this material is depolymerized and vaporized thereby providing a stream of nitrogen saturated with cyclopentadiene. Concurrently, the second distillation vessel is heated while dry nitrogen is passed therethrough. The nitrogen stream acting as a carrier sweeps the vapors of both starting materials into the thermal reactor tube which is heated at a temperature of 180° C. It is found that the effluent gas contains cyclopentadienyl manganese tricarbonyl as evidenced by the deposition of this material on the surfaces of the cooler portions of the reactor tube. When the original amount of manganese pentacarbonyl is completely volatilized from its container, the apparatus is cooled and disassembled. Physical removal yields crystalline cyclopentadienyl manganese tricarbonyl from the reactor tube surfaces.

Example II

Ninety-eight and eight-tenths parts of manganese pentacarbonyl and 203 parts of dicyclopentadiene were mixed in a vessel at room temperature and remained under agitation for 16 hours during which time a slow evolution of gas was observed. The mixture was subsequently warmed to 55° C. for 2 hours followed by an additional 2 hour heating at 100° C. Gas evolution increased during the periods of elevated temperature. The mixture was further heated at the reflux temperature of the dicyclopentadiene while the system was under vacuum. After about 20 hours of heating, the rate of gas evolution decreased and a yellow solid was sublimed from the reaction mixture. This crystalline substance was a mixture of manganese carbonyl and cyclopentadienyl manganese tricarbonyl. Approximately 25 parts of cyclopentadienyl manganese tricarbonyl were separated from the mixture in the form of very light yellow crystals melting at 63 to 67° C.

Example III

Methylcyclopentadiene dimer (800 parts) and manganese pentacarbonyl (100 parts) are admixed in a vessel equipped with means for agitation, heating means and reflux condenser. The contents of the vessel are kept under agitation while heated to the reflux temperature of the di(methylcyclopentadiene) which is about 175° C. Heat and agitation are continued for about 10 hours after which time the contents of the vessel are fractionally distilled under reduced pressure. A good yield of methylcyclopentadienyl manganese tricarbonyl is distilled from the reaction mixture at 106° C. and a reduced pressure of 12 millimeters of mercury. In addition unreacted di(methylcyclopentadiene), methylcyclopentadiene and manganese carbonyl are recovered from the reaction mixture.

Example IV

In a pressure resistant vessel equipped with a reflux condenser in combination with a vent for release of gaseous products, heating means and means for agitation, are admixed 100 parts of manganese pentacarbonyl chloride, 600 parts of di(methylcyclopentadiene) and 1000 parts of benzene. The vessel is sealed and heated to 250° C. with agitation. This temperature is maintained for 2 hours during which time any gas produced by the reaction is vented in such a manner that the reactants are returned to the reaction vessel through the reflux condenser. After the heating is discontinued, the vessel is discharged and the reaction mixture is fractionally distilled under reduced pressure. A good yield of ethylcyclopentadienyl manganese tricarbonyl having a boiling point of 48–49° C. at 0.3 mm. pressure results.

Example V

The procedure of Example IV is repeated using 100 parts of manganese pentacarbonyl bromide, 1200 parts of tetrahydrofuran as a carrier and 1000 parts of indene. The product is a good yield of indenyl manganese tricarbonyl having a melting point of 50–51° C.

Example VI

Tertiary-butyl cyclopentadienyl manganese tricarbonyl is prepared by the reaction of tertiary-butyl cyclopentadiene and manganese carbonyl according to the procedure in Example II.

Example VII

Ethylcyclopentadiene dimer (600 parts) and 50 parts of manganese pentacarbonyl iodide are reacted in 450 parts of the diethyl ether of diethylene glycol by heating the reaction mixture under agitation in the reflux temperature for 4 hours. Fractional distillation under reduced pressure gives a good yield of ethylcyclopentadienyl manganese tricarbonyl.

As illustrated by the examples, the temperatures at which the process of this invention is conducted varies from about room temperature to about 300° C. when the process is conducted in the liquid phase. However, best results are achieved at temperatures where the polymerization tendency of the cyclopentadienyl compound employed is minimized. Thus, temperatures from about 55° C. to above 175° C. are successfully employed in the liquid phase reaction. For the vapor phase reaction higher temperatures are employed. Particularly good results are obtained when the process is conducted at the cracking temperature of the dimer of the cyclopentadienyl hydrocarbon.

When it is desired to conduct the reaction at the reflux temperature of the system, an inert diluent may be employed in order to establish the temperature at which the system will reflux under pressure. Diluents which are employed in the process of this invention are the aliphatic and aromatic hydrocarbons and ethers. Illustrative examples of such compounds include benzene, xylene, toluene, iso-octane, n-heptane, hexane, 1,4-dioxane, tetrahydrofuran, dibutyl ether and the like.

An important advantage of the present invention is that any unreacted cyclopentadienyl hydrocarbon compound and manganese compound and manganese carbonyl may be recycled for further use. The cyclopentadienyl hydrocarbon is conveniently separated from the reaction mixture by distillation while the manganese carbonyl may be recovered by distillation and sublimation.

The cyclopentadienyl hydrocarbon employed in the process of this invention is either a monomeric cyclopentadiene or substituted cyclopentadiene or the dimer of such a compound. The preferred compounds are cyclopentadiene itself and the lower alkyl cyclopentadiene compounds having one alkyl substituent of up to four carbon atoms, and the dimers of these compounds. Representative examples of the preferred monomerics include methylcyclopentadiene, ethylcyclopentadiene, propylcyclopentadiene, n-butyl cyclopentadiene, sec-butylcyclopentadiene and tertiary-butyl cyclopentadiene. The dimers of these compounds are also conveniently employed.

When conducting the process of this invention, carbon monoxide and hydrogen are given off as reaction products. Good results are, therefore, obtained when these gases are removed from the reaction mixture as they are formed. Thus, the reaction is conveniently conducted at atmospheric pressure or lower, care being taken to provide a necessary auxiliary venting equipment to properly dispose of the gases produced. The hydrogen and CO are conveniently collected, separated and retained for other uses.

When it is desired to conduct the reaction at above the boiling point of the system, a pressure resistant vessel is employed. To insure the minimum of CO and $H_2$ above the reaction mixture, the vessel is preferably provided with a gas exhaust valve in conjunction with a reflux condenser trap to prevent the escape of reactants and diluent.

When conducting this process on a continuous basis in the vapor phase, a condensing apparatus for the continuous condensation and removal of the cyclomatic compound subsequent to its formation in the reactor can be employed. Likewise, scrubbers or other purifiers to remove impurities entrained in the inert carrier are conveniently utilized. The latter modification enables a recycle of both the carrier and unreacted starting materials subsequent to drying by means of a suitable adsorbent or by other means. Another variant by which benefits are to be derived consists of premixing the starting materials of this process and subsequently transferring the resulting mixture to the heated reaction zone. As an example of this variant, manganese carbonyl can be admixed with a cyclomatic hydrocarbon at room temperature or slightly above, that is, at a temperature of about 25° C., and this mixture can then be transferred to a reaction zone at a temperature in the order of between about 100° and about 300° C. at which temperature reaction occurs with formation of the cyclomatic manganese tricarbonyl compound. Another variation in the process of the present invention, which variation affords more precise control of the temperature of the vapor phase embodiments of this invention, when indeed such control is efficacious, involves vaporizing one of the starting materials and transferring the same to the heated reaction zone while concurrently introducing into the said zone the other starting material at essentially room temperature. Thus, to regulate the temperature of a vapor phase process, a cyclomatic hydrocarbon can be vaporized and the vapors introduced into a reaction zone heated to the appropriate temperature (e.g. 100° to 300° C.) while a manganese pentacarbonyl is concurrently introduced at essentially room temperature. Another general modification in the process of this invention is the utilization of a temperature gradient in the reaction zone. For example, the reactants can be introduced into a first reaction stage or zone heated to a temperature of about 50° C. and the partially reacted materials can be transferred into a second stage heated to a temperature of about 100° C. Such a process can be repeated utilizing successfully higher temperatures, for example, 250° C. or higher. Shorter contact times are preferred at the higher temperatures to obtain the best results. Similarly, a continuous reaction zone can be employed, the temperature of which is controlled such that a uniform temperature gradient is provided. In this case, the temperature range is selected in accordance with the governing principles elucidated hereinbefore. Another variant in the process of this invention involves the use of pumping means to cause the vapors of the reactants and end products to circulate throughout the apparatus employed. Such a variant obviates the necessity of utilizing an inert carrier such as an inert gas, substantially anhydrous nitrogen and the like. Other variations within the spirit and scope of the present invention will be apparent to one skilled in the art.

The product cyclopentadienyl manganese tricarbonyl compounds are conveniently separated from the reaction mixture by fractional distillation and/or sublimation. When the compound is a liquid, such as methylcyclopentadienyl manganese tricarbonyl, it is separated free of any unreacted manganese carbonyl by fractional distillation. Excellent results are obtained when such distillation is conducted at reduced pressure. When the reaction product is a solid, such as cyclopentadienyl manganese tricarbonyl, it is separated from the reaction mixture by distillation of all volatile material followed by sublimation of the residue. The product thus recovered ordinarily contains unreacted manganese carbonyl from which it may be separated by fractional distillation and/or fractional sublimation under controlled conditions. When the product is used as an antiknock agent in gasoline, it is desirable to use the solid reaction product containing manganese carbonyl without further separation or purification.

The ratio of the reactants employed in the process of the present invention is contingent upon the chemical structure of the materials utilized. However, in general, from between about one and about four molecules of cyclopentadienyl moiety to one atom of manganese as a carbonyl are employed. Although good yields are obtained with essentially stoichiometric quantities of reactants as just defined, it is preferred to employ an excess of the cyclomatic hydrocarbon.

The cyclopentadienyl manganese tricarbonyl compounds prepared by the process of this invention are outstanding antiknock agents when added to liquid hydrocarbon fuels of the gasoline boiling range. For example, when methylcyclopentadienyl manganese tricarbonyl was added to a commercial gasoline having an initial boiling point of 94° F. and a final boiling point of 390° F. in amount sufficient to prepare a composition containing 1 gram of manganese per gallon, the octane number of the gasoline was raised from 83.1 to 92.3 as determined by the Research Method. The Research Method of determining the octane number of a fuel is generally accepted as a method of test which gives a good indication of fuel behavior in full-scale, automotive engines under normal driving conditions and the method most used by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in test procedure D–908–55 contained in the 1956 edition of "ASTM Manual of Engine Test Methods For Rating Fuels."

The above is merely illustrative of the antiknock effect realized by the use of a cyclopentadienyl manganese tricarbonyl compound. Good results are also obtained when other compounds prepared by the process of this invention, such as cyclopentadienyl manganese tricarbonyl, ethylcyclopentadienyl manganese tricarbonyl, indenyl manganese tricarbonyl and the like are employed in gasolines.

As manganese carbonyl itself is also an effective antiknock agent, the crude reaction product which often results from the process of this invention containing manganese carbonyl in admixture with the cyclopentadienyl manganese tricarbonyl compound can be used as an antiknock agent without further purification. Thus, it is found, for example, that when a mixture of manganese carbonyl and methylcyclopentadienyl manganese tricarbonyl containing 25 mole percent manganese carbonyl is added to a gasoline having an octane number of 91.8 in amount sufficient to give a manganese concentration of 2.57 grams per gallon, an increase in the antiknock quality of the gasoline to 99.3 octane number is affected, as measured by the Research Method.

I claim:

1. A process for the preparation of a monomeric cyclopentadienyl manganese tricarbonyl, said process being characterized by heating to a temperature between about 100 and 300° C. a liquid mixture of dimeric manganese pentacarbonyl with an excess of the dimer of a cyclopentadiene selected from the class consisting of unsubstituted and monoalkyl substituted cyclopentadienes in which the alkyl group has up to 4 carbon atoms, to cause the materials to react and form said monomeric compound.

2. The process of claim 1 in which the cyclopentadiene dimer is the dimer of methyl cyclopentadiene.

References Cited in the file of this patent
UNITED STATES PATENTS

| 2,810,736 | Catlin et al. | Oct. 22, 1957 |
| 2,818,416 | Brown et al. | Dec. 31, 1957 |